May 15, 1956 J. L. LAWSON 2,746,017

PROTECTION OF RECEIVER AGAINST OVERLOAD

Filed March 18, 1943 4 Sheets-Sheet 1

INVENTOR
JAMES L. LAWSON
BY [signature]
ATTORNEY

May 15, 1956 J. L. LAWSON 2,746,017
PROTECTION OF RECEIVER AGAINST OVERLOAD
Filed March 18, 1943 4 Sheets-Sheet 2

INVENTOR
JAMES L. LAWSON
BY
ATTORNEY

INVENTOR
JAMES L. LAWSON
BY
ATTORNEY

May 15, 1956 J. L. LAWSON 2,746,017

PROTECTION OF RECEIVER AGAINST OVERLOAD

Filed March 18, 1943 4 Sheets-Sheet 4

INVENTOR
JAMES L. LAWSON
BY [signature]
ATTORNEY

United States Patent Office 2,746,017

Patented May 15, 1956

2,746,017

PROTECTION OF RECEIVER AGAINST OVERLOAD

James L. Lawson, Cambridge, Mass., assignor, by mesne assignments, to the United States of America as represented by the Secretary of the Navy Application March 18, 1943, Serial No. 479,662

4 Claims. (Cl. 333—13)

This invention relates to an automatic electric breakdown switch adapted for use in radio transmitting and receiving systems in which a transmitter and a receiver are operated in connection with a single antenna system and designed to protect the receiver against overload during periods of transmission.

There are great advantages to be realized in radio transmitting and receiving systems, especially radio echo detection and locating systems operating on microwaves, by operating the transmitter and receiver in connection with a common antenna. In this manner great economy of antenna equipment and space required thereby can be effected and the problem of synchronizing the scanning of two systems of directive antenna arrangements can be entirely avoided. One of the great difficulties of such systems is that during periods of transmission the receiver tends to be overloaded, which often results in permanent damage to the receiver. In radio echo apparatus, where it is desired to receive echoes arriving at extremely short time intervals after transmitted pulses, mechanical switching arrangements are out of the question because of the extremely short time intervals involved. I have found that attempts to operate a transmitting and receiving system through a common antenna for radio echo detection without any switching apparatus at all by relying upon the nonlinearity of a receiver input and the careful adjustment of spacing between receiver input and the junction of the transmitter and receiver connections to the antenna feed do not yield satisfactory results when transmitters of reasonably high power output and receivers employing a crystal detector in the input stage, as is generally found necessary for high sensitivity microwave reception are employed.

It is an object of this invention to provide a rapidly operating automatic switch for radio transmission and reception systems employing a common antenna and to utilize for this purpose an apparatus for promoting an electrical breakdown during periods of transmission. It is a further object of this invention to provide an automatic electrical breakdown switch for the aforesaid purpose in which a breakdown initiating voltage of greater magnitude than the peak voltage of the travelling waves in the transmitter output transmission line can be obtained. Further objects of this invention will be readily apparent from the following description.

The accompanying drawings show several of the possible forms of apparatus adapted to operate in accordance with this invention. In the drawing.

In accordance with this invention there is associated with the transmission line or wave guide leading to the receiver input, an electrical discharge gap which breaks down when excited by oscillations set up by the transmitted energy proceeding from the transmitter, thus short-circuiting the receiver input and reducing the energy which is able to reach the receiver input. Arrangement is also made in most practical applications of the invention for providing a partial vacuum in the space which constitutes the electrical discharge gap in order to reduce the voltage of the discharge. In order that the discharge may occur before voltages sufficient to damage the receiver appear in the receiver input feed, which voltages are usually less than those necessary to initiate a discharge at a gap, even when a partial vacuum is maintained at the gap, there is provided in accordance with this invention means associated with the electrical discharge gap for stepping up the voltage appearing in the transmission line so that a considerably higher voltage will appear across the electrical discharge gap at the instant preceding the discharge, thus promptly bringing about a discharge. In order to step up voltages for this purpose in operation at the extremely high frequencies of microwave transmission I employ a resonant transformer which is essentially a resonant cavity or a resonant section of transmission line which is excited at a low voltage point and is provided with an electrical discharge gap at a high voltage point. Further explanation of the invention can best be made with reference to the drawings.

Figures 1, 3, 4:
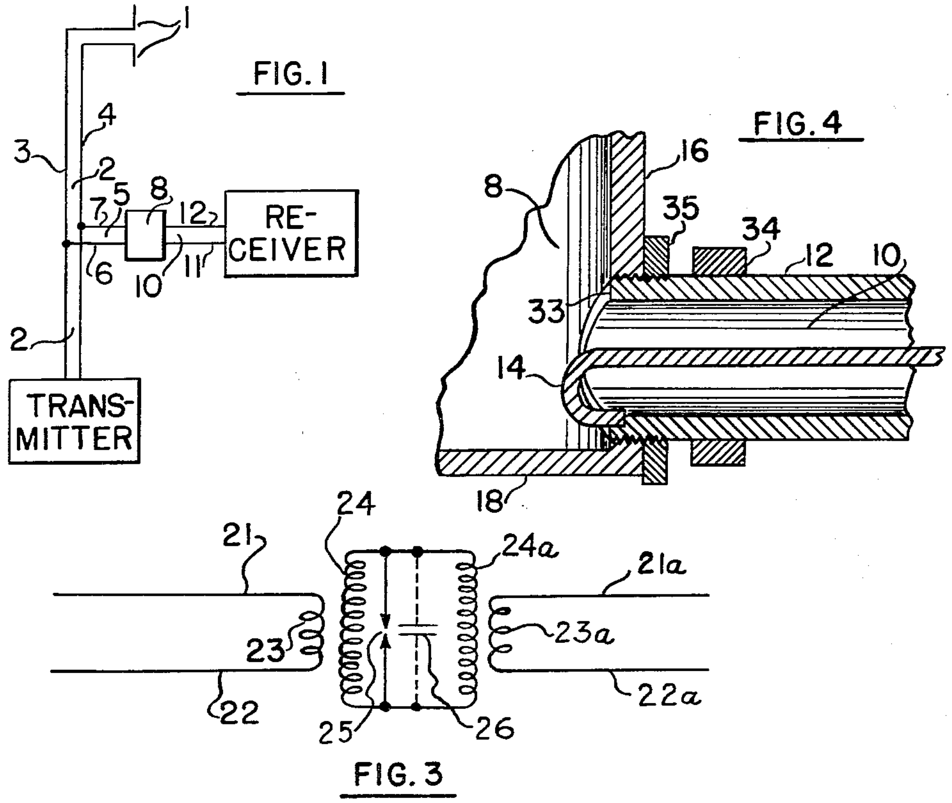
Fig. 1 is a diagram showing a radio transmitting and receiving system of a type adapted for the application of this invention.
Fig. 3 is a diagram showing an equivalent circuit relating to the invention.
Fig. 4 is a cross-sectional view of an arrangement for making the apparatus of Fig. 2 adjustable in certain respects.

Fig. 1 is a simplified diagram showing in a general way an apparatus for transmitting and receiving radio waves over a single antenna 1 which is common to the transmitter and the receiver. The antenna 1 is connected to the transmitter by means of a two-conductor line 2, the conductors of which are marked 3 and 4. The receiver is connected with the antenna 1 by means of a branch to conductor line 5, the conductors 6 and 7 of which are connected respectively to the conductors 3 and 4 of the line 2. The other end of the line 5 is coupled into an automatic electric breakdown device 8 constructed according to the principles hereinafter described. Another transmission line 10 having conductors 11 and 12 connects the device 8 with the input of the receiver. The device 8 is so constructed that an electrical breakdown occurs therein while the transmitter is in operation, thus almost completely isolating the receiver from the rest of the system and allowing most of the oscillatory energy generated at the transmitter to proceed to the antenna 1. When the transmitter ceases operation, the electrical breakdown in device 8 is interrupted and the connection between the transmission line 5 and 10 is no longer interrupted by a practical short circuit, so that the receiver is effectively connected to the antenna 1 by means of the transmission lines 10, 5 and 2.

Figure 2:
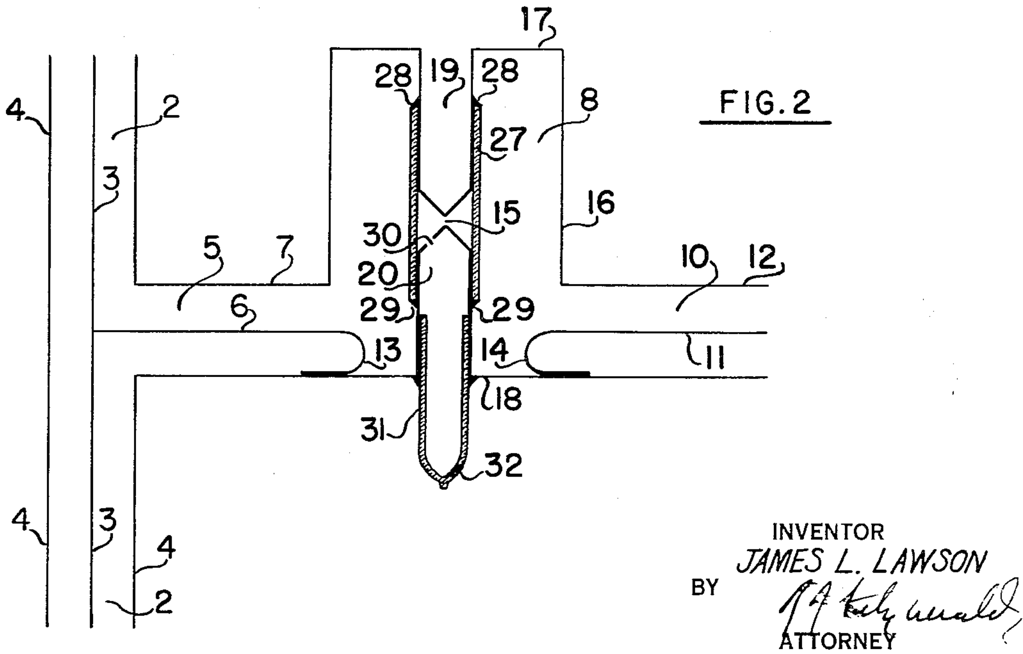
Fig. 2 is a diagrammatic cross section of one of the simpler forms of the invention.

Fig. 2 shows a form of apparatus according to this invention that is particularly simple in construction. The transmission line leading from the transmitter to an antenna system appears at 2 and is shown as being of the coaxial conductor type, having an inner conductor 3 and an outer conductor 4. Another coaxial transmission line 5, having an inner conductor 6 and an outer conductor 7 which are connected respectively to the inner conductor 3 and outer conductor 4 of the transmission line 2, leads from the junction with the transmission line 2 to the apparatus 8, to which the transmission line 5 is coupled by means of a small loop 13. Another loop 14 couples the apparatus 8 to a transmission line 10 which leads to the input of a receiver (not shown), said last-mentioned transmission line having an inner conductor 11 and an outer conductor 12.

The apparatus 8 comprises a cylindrical resonator in which is situated an electric discharge gap 15 appropriately located as hereinafter described. The walls of the resonator are made of conducting material. There is an outer cylindrical wall 16, end walls 17 and 18 and inner cylindrical posts 19 and 20 which serve as gap electrodes. The resonator, which is here used as a resonant transformer as will be presently explained, may be regarded as a capacitance-loaded cylindrical cavity or it may be regarded as a resonant length of coaxial line provided with an interruption in the central conductor. These concepts are usually quite interchangeable, there being no sharp line of demarcation between the resonators commonly regarded in one manner or in the other. In this type of resonator a high electric voltage and consequently a very high electric stress is built up across the gap 15 when the resonator is excited by oscillations of the frequency to which the resonator is tuned. The greatest oscillating magnetic field in such a resonator occurs near the ends of the resonator so that these places are particularly well suited for exciting the resonator with relatively low voltages. If the resonator is so excited, it will act as a resonant transformer and build up voltages at the gap 15 which are much higher than the exciting voltages which appear across the loop 13. A similar effect could be obtained by exciting the resonator by a "probe" in a location of strong electric fields, the coupling in such case being electrostatic.

The behavior of the resonator as a voltage step-up device is considerably affected by the "Q" of the resonator. The Q may be defined as the ratio of energy lost per cycle of oscillation to the energy stored in the resonator. The "unloaded Q," or $Q_U$, corresponds to this ratio for the resonator without coupling to outside circuits or transmission lines, and is higher than the "loaded Q," or $Q_L$, which refers to the Q value for the resonator in service conditions, with transmission lines coupled in. If $Q_L \ll Q_U$, the voltage step-up is roughly proportional to the square root of $Q_L$. But the losses in the resonator are roughly proportional to $$\frac{Q_L}{Q_U}$$

so that if $Q_U$ is given and $Q_L$ is increased, as by decreasing the coupling between the transmission lines and the resonator, the voltage step-up and consequently the receiver protection will be increased, but the losses will likewise be increased. It is consequently desirable to provide as high a value of $Q_U$ as possible.

When the resonator 8 is excited at low level, as by a received signal, although high voltages appear across the gap 15, the voltages picked up by the output loop 14 are relatively low and are commensurate with the voltages appearing across the loop 13, the nature of the coupling to the cavity resonator being essentially the same at 14 as at 13. It is also desirable to minimize direct coupling between the loops 13 and 14 so that a breakdown discharge at the gap 15 may have a maximum shielding effect when it occurs. The importance of this refinement is not great for apparatus operating with low power transmitters, but with high power operations this factor is of very great moment and is a major design consideration.

Considering the resonator 8 including the electrode 19 and 20 as a resonant section of coaxial conductor transmission line, it is to be noted that resonance will ordinarily occur for a given frequency when the length of the resonant section of line is approximately a quarter of the wave length of oscillations of such frequency in the line. This is because the gap 15 interrupts the inner conductor 19, 20, so that a quarter-wave resonator is formed. The gap 15 may be located at any convenient place on the inner conductor 19, 20. In Fig. 2 the gap 15 is centrally located. This is convenient for the application of the glass envelope 27 in the manner above described. The gap could, however, be otherwise located, such, for instance, as at one end of the inner conductor of the resonator, between said inner conductor, which could be an elongated electrode 20 and the end wall 17 of the resonator. In a resonator approximating the coaxial conductor form in which the gaps at which high voltages may be excited is located at an axial extremity of the resonator, the magnetic field is usually highly concentrated at the opposite extremity of the resonator, which may be an advantageous feature where close coupling to the transmission lines 5 and 10 is desired.

In accordance with the well-known principles applying to the behavior of resonant transmission lines, it will be seen that the resonator 8 may also be provided with an axial dimension in the neighborhood of three-quarters of a wave length, for instance. Various forms of resonators, including arrangements of resonant sections of transmission line, it will be seen, are capable of providing the resonant transformation employed in the practice of this invention.

It is apparent that many different types of resonators may be used to provide upwards transformation of line voltage to gap voltage and downwards transformation to the receiver input in accordance with this invention. As previously mentioned there is no sharp distinction between cavity resonators and resonant sections of transmission line in this respect. Various methods of coupling between the transmission lines or pipes and the resonator in question may also be used.

Fig. 3 shows an equivalent circuit for further illustration of the operation of the apparatus 8 in Fig. 1. The conductors 21 and 22 form part of a receiver input transmission line and the conductors 21*a* and 22*a* form a further part of such receiver transmission line. Interposed between the said parts of the receiver input transmission line are two transformers 23, 24 and 24*a*, 23*a*. One of these has a primary 23 and a secondary 24 adapted to provide a voltage in the secondary 24 which is higher than that impressed on the primary 23. The secondary 24 is connected to the primary 24*a* of the second transformer, which also includes a secondary 23*a* such that the secondary 23*a* will produce a stepped-down voltage when the primary 24*a* is excited. Thus when a signal occurs in the line 21, 22, its voltage is stepped up by the transformer 23, 24 and then stepped down again by the transformer 24*a*, 23*a*, and transmitted to the line 21*a*, 22*a*. A discharge gap 25 is provided across the transformer windings 24 and 24*a*, so that if the impressed voltage is above a predetermined minimum, an electrical breakdown will take place at the gap 25 and the previously described transmission of signals from the line 21, 22 to the line 21*a*, 22*a* will be interrupted because the transformer windings 24 and 24*a* will be substantially short-circuited by the gap. Such a short circuit will be particularly effective with respect to the transmission line 21, 22 because a short circuit across the secondary 24 will permit a very considerable alternating current to flow through the primary 23. The amount of energy which reaches the line 21*a*, 22*a* when a breakdown discharge occurs at the gap 25 is substantially independent of the amplitude of the oscillations impressed upon the primary 23 by the line 21, 22 and depends practically entirely upon the voltage drop occurring at the discharge gap 25. When the energy fed to the line 21, 22 becomes insufficient to maintain the breakdown discharge at the gap 25, the discharge is interrupted and energy can again be transferred with good efficiency between the line 21, 22 and the line 21*a*, 22*a*, through the transformers 23, 24 and 24*a*, 23*a*.

In practice the transformer 23, 24 is tuned, which may be shown on the equivalent circuit diagram of Fig. 3 by the addition of a condenser 26 shown in dotted lines. This serves to improve energy transfer along the line **21, 22, 21*a*, 22*a*.**

The occurrence of breakdown in a resonator such as that shown in Fig. 2 acts to detune the resonator. Since resonance is relied on for voltage transformation in such a resonator, the transformation effect may be expected to disappear during the occurrence of breakdown.

In order to promote ready and reliable occurrence of electrical breakdown across the gap 15 whenever the transmitter associated with the system is in operation, means are preferably provided to maintain a partial vacuum in and around the gap 15. In the apparatus of Fig. 2 are shown vacuum-producing and maintaining means of a simple type well adapted for ease of manufacture even in a laboratory. The posts 19 and 20 are engaged in a common close-fitting glass sleeve 27 which is sealed to each of the posts 19 and 20 by wax seals 28 and 29 respectively. It is advisable to prepare such wax seals after the glass has been heated so that the wax will penetrate into the boundary between the glass sleeve and the metal post. A vacuum seal prepared in this fashion will provide a reasonable service life. One reason why wax seals can be employed in practical apparatus of this type is that it is not necessary to maintain a high vacuum in the gap and indeed pressures ranging from about five millimeters of mercury to about fifteen centimeters of mercury are preferred. The residual gas may conveniently be air, preferably moist air, but some improvement can be obtained by employing a mixture of hydrogen and water vapor.

In order to provide a simple and convenient way of evacuating the gap 15 after the glass sleeve 27 is sealed in place, the post 20 is preferably made hollow and is provided with a small hole 30 connecting the hollow interior of the post 20 with the gap 15. A glass tube 31 is then sealed by a wax joint, such as those previously described, into the exterior end of the hollow part of the post 20, as shown on Fig. 2. After the space in the gap 15 has been evacuated by means of suitable pumping apparatus, the glass tube 31 may be sealed off in the usual manner as shown at 32.

The cavity resonator 8 should be so dimensioned that its natural frequency in the described mode of oscillation corresponds to the frequency at which the radio transmission and receiving system is operated. The most important dimensions determining the resonant frequency are the axial length of the resonator, the distance and configuration of the gap 15 and the volume of the resonator.

In order to minimize the amount of power dissipated in the gap 15 and thereby to keep down the utilization of transmitter power and undesired heating of the resonator and discharge gap, it is advantageous to make a careful adjustment of the length of the transmission line 5. I have found that this length should very closely approximate an electrical quarter-wave length of the oscillations in the said transmission line or an odd multiple thereof, the physical length preferable being somewhat shorter than a corresponding number of quarter-wave lengths on account of the loading effect of the loop 13 when the resonator into which it is coupled is in a state of breakdown. The said loading effect is substantially determined by the self-inductance of the loop. It cannot exceed the equivalent of a quarter-wave length and is usually appreciably less than such amount.

A smaller adjustment in the length of the line 5 may be desirable on account of the "end effect" of the junction of the lines 2 and 5. This last consideration may often be neglected in practice without appreciable interference with power transmission.

The advantage of the foregoing adjustment of the length of the transmission line 5 between its junction with the transmission line 2 and its termination in the resonator 8 arises from the fact that the gap 15, when electrical breakdown occurs, has a greatly non-linear characteristic, which is to say that the voltage across the gap does not rise in proportion with the exciting voltage after breakdown occurs, and indeed may fall somewhat, so that the electrical discharge is considerably mismatched to the transmission line 5 and presents across the line a very low impedance, practically a short circuit (which appears in series with the self-inductance of the loop, the latter being merely a line-lengthening factor). Reflection of energy will then occur, which is to say that the quarter-wave length of transmission line 5 will act as a resonator and present a high impedance at its junction with the transmission line 2 thus opposing the acceptance of very much energy by the transmission line 5 and the resonator 8 and causing most of the energy in the transmission line 2 to proceed in the desired path from the transmitter to the antenna system or other terminal apparatus. In addition I have found that since the receiver input usually exhibits a non-linear characteristic, although not to so great a degree as does the electrical discharge apparatus of this invention, the transmission line 10 should be adjusted to a suitable electrical length in order to reduce the acceptance of energy by the receiver from the disturbances set up by the electrical discharge at the gap 15, as more fully described in one of my copending applications.

In apparatus according to this invention, as illustrated by the apparatus of Fig. 2, the oscillatory energy transmitted to the receiver by the transmission line 10 during periods of transmitter operation is independent of the power of the transmitter but depends only on the characteristics of the gap 15 and its associated apparatus. Oscillatory voltages at the gap 15, after they are transformed downwardly by the resonator 8 into the loop 14, do cause some oscillatory energy to reach the receiver through the transmission line 10, but these voltages are relatively low after breakdown occurs on account of the conductivity of the gap when the breakdown is initiated and ionization occurs, so that in any case the disturbances reaching the receiver are much less than would be communicated directly from any transmitter of practical power output.

During pauses between transmitter operation when there is consequently no breakdown at the gap 15, received signals picked up by an antenna system and fed into the transmission line 2 are able to proceed down the transmission line 5 and are coupled to the input of the transmission line 10 with very little loss, the loops 13 and 14 being coupled to the same oscillatory magnetic field while the resonator 8, although excited somewhat, absorbs very little by way of losses because of the absence of a breakdown discharge across the gap 15, the received signals being usually far too weak to excite any breakdown. If the received signals were strong enough to excite a breakdown at the gap 15, they would be so strong that if the apparatus 8 were not interposed between the lines 5 and 10 the receiver would be permanently damaged by the received signal energy. In order that the loss of received signal amplitude on account of the losses in the glass sleeve 27, which is located in the neighborhood of the high voltage part of the resonator 8, and from other causes, may be kept at a minimum while a maximum of protection to the receiver is afforded during periods of transmission, it would be desirable to provide adjustability in the degree of coupling between the input loop 13 and the resonator 8. This can of course be provided by known mechanical expedients, but because it is also desirable to provide considerable rigidity in the transmission line 5 and its connection with the resonator 8, thus assisting in the support of the apparatus 8, I prefer instead to provide an adjustment of the coupling between the loop 14 and the apparatus 8, which then permits considerable minimizing of the loss of signal amplitude, although with this adjustment it is not possible to reach an exact coincidence of maximum protection and minimum reception loss if the coupling of the loop 13 should not happen to be at its optimum value. The practical difference between the results achieved with the two types of adjustment is so small that I prefer the adjustment of the loop 14 for reasons of convenience. The transmission line 10, not being directly connected with the transmission line 2, is not under operating conditions subjected to the large amount of oscillatory energy travelling from the transmitter to the antenna, so that it may be made smaller and less rigid than the transmission line 5 and it is therefore better adapted for mechanical adjustment.

Fig. 4 shows one possible and convenient method of adjusting the coupling of the loop 14 to the resonator 8. In this arrangement the outer conductor 12 of the transmission line 10 is threaded at its extremity 33. A correspondingly threaded aperture is provided in the cylindrical wall 16 of the resonator 8. A flange 34 which may have a milled or knurled outer surface may be conveniently provided on the outside of the conductor 12 just back of the threaded portion for rotational manipulation of the transmission line 10. The inner conductor 11 is continued into the previously described loop 14 and ends in electrical and mechanical contact with the outer conductor 12. Thus when the entire transmission line 10 is rotated, the plane of the loop 14 which protrudes into the resonator 8 will likewise be rotated, thus varying the coupling between the resonator 8 and the transmission line 10. The adjustment for maximum reception during listening periods can be readily made with a signal generator connected to the transmission line 2 (see Figs. 1 and 2) or otherwise. Once the desired adjustment is found, it can be maintained by means of a lock-nut 35 located on the threaded portion of the conductor 12.

Before taking up the other forms of apparatus according to this invention shown in Figs. 5, 6, 7 and 8, it is desirable to consider certain characteristics of the operation of apparatus according to this invention, which apparatus has already been illustrated in connection with Fig. 2. I find that there is a tendency for the voltage of the residual disturbance reaching the receiver through the transmission line 10 during periods of transmission to be somewhat greater about the time of the initiation of the breakdown than after the breakdown is fully established. There is also a "turn-on" effect arising from the fact that once the breakdown device has begun operating the slight residual ionization remaining from the previous discharge aids the next discharge, whereas the first discharge must come about without such assistance. This effect is the important reason for providing the "keep-alive" electrode 40 described below in connection with Fig. 5.

I also find that a definite although small time is required after electrical discharge has ceased at the gap 15 for "recovery" of the resonator 8 to its normal condition for the proper reception of signals which are desired to be received. This effect probably results from persistence of ionization for a short while after the discharge, which ionization causes a loading effect upon the resonator 8, absorbing some of the signal energy if there is a signal present and possibly also detuning the cavity slightly. Under ordinary conditions, however, the ionization appears to persist only for an extremely short period of time and does not interfere with the reception of radio echoes for the detection and location of objects a hundred yards or more away. Another factor which affects the "recovery" of the apparatus 8 is the magnitude of the parameter Q. If the Q is high the residual ionization after the discharge may cause a substantial detuning effect while said ionization persists. For this reason the gap atmosphere should have a prompt "clean-up" characteristic (deionization time) for use in a high Q resonator.

Figure 5:
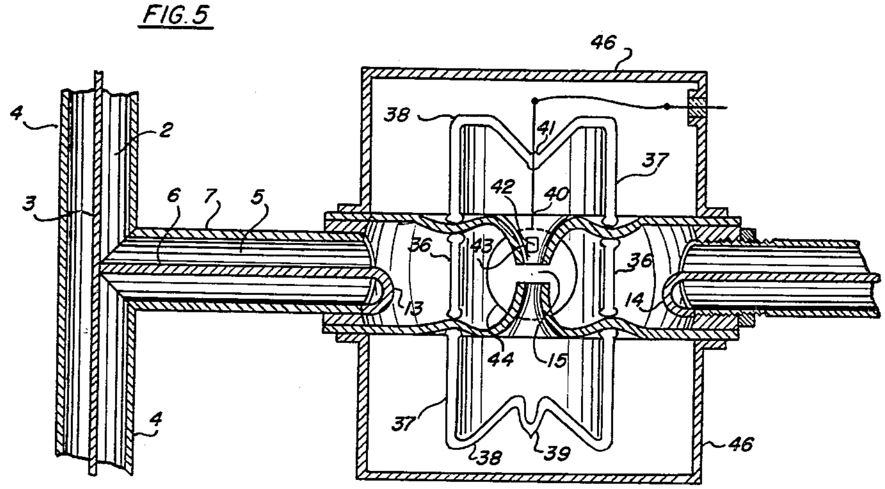
Fig. 5 is a cross-sectional view of another apparatus conforming to the invention and embodying certain modifications and improvements.

Since the early stages of my invention a number of variations in the construction of apparatus operating in accordance therewith have been made, some of which are shown in Figs. 5, 6, 7 and 8, and many of which effect some improvement in the degree of protection to the receiver afforded by the device, which is to say that the oscillatory voltage occuring across the gap is minimized to a more considerable extent. In some cases, the loss of received signals during listening periods has also been somewhat reduced by modifications in design. Fig. 5 shows a form of apparatus operating according to the principles heretofore described which is particularly well adapted to protect the more sensitive types of receivers, such as those in which the input stage comprises a heterodyne mixer employing a silicon crystal as a rectifying element, and which is also successful in keeping at a low level the loss occurring during reception. In this apparatus the resonant transformer or resonator is formed in a torodial shape instead or in the shape of a flat-topped cylinder such as that shown in Fig. 2. The coupling loops 13 and 14 are again located at relatively low voltage and high magnetic field locations in the resonator so that a relatively high ratio of voltage transformation will occur between the input loop 13 and the gap 15. The gap 15 in this case if formed by a close approach of the upper and lower surfaces of the inner part of the toroid—in other words, the walls of the resonator are not completely toroidal but are interrupted by a gap in the central plane near the axis. The glass vacuum maintaining means is here sealed directly to the conducting walls of the toroid at high temperature in accordance with the modern technique of metal-to-glass seals. The conducting walls of the resonator are preferably made of copper. The glass vacuum maintaining means comprises an inner cylindrical portion 36, an outer cylindrical portion 37 and end portions 38. An opening (not shown) is usually left in one of the ends 37 during the process of manufacture until after the metal-to-glass seals have been successfully prepared, after which the enclosed space is evacuated and the exhaust tube or opening sealed off as shown at 39. In addition, in the form of apparatus shown in Fig. 5, an electrode 40 is provided which passes through one of the ends 38 of the glass envelope, being sealed thereto as shown at 41. The electrode 40 does not penetrate into the electric field of the resonator but is brought sufficiently close to the gap 15 so that when a high steady voltage is impressed upon it with respect to the conducting walls of the resonator, a small amount of ionization will take place in the neighborhood of the gap 15. In order to maintain a very slight amount of ionization in the neighborhood of the extremity of the electrode 40 in order that such electrode may function more effectively, a small amount of radioactive material 42 may be provided upon the electrode 40, the end of the electrode being formed into a small cup 43 for that purpose. The voltage impressed upon the electrode 40 may conveniently be of the order of 1000 volts, but it should be applied through a high resistance, such as 10 megohms, in order to prevent excessive dissipation of power during periods of high ionization resulting from operation of the apparatus during periods of transmission. The continuous presence of a small degree of ionization in the neighborhood of the gap 15 as a result of the electrode 40 operates to mitigate the "turn on" effect previously described. The operation of the electrode 40 tends to prevent the appearance of relatively higher voltages in the initial stage of the breakdown by promoting the occurrence of a breakdown at a somewhat lower voltage than would otherwise be necessary. The degree of ionization maintained by the electrode 40 is so small that very little reduction of the amplitude of the received signal results therefrom. When there is no breakdown discharge, the ionization provided by the electrode 40 is generally limited to portions of the resonator not in the oscillating field or at least not in the high intensity portions of such field.

Although the metal-to-glass seals of the apparatus shown in Fig. 3 are somewhat more difficult to prepare than the wax seals employed in the apparatus of Fig. 1, they are more rugged, have better resistance to high temperatures, and are less inclined to leak.

Both the apparatus of Fig. 5 and that of Fig. 2 may each be provided with tuning adjustments (not shown) such as those commonly used for tuning cavity resonators. Such arrangement might be the provision of a rotatable vane of copper or brass in a region of high magnetic field intensity or a retractable plunger protruding into the cavity resonator. Deformation of the cavity might also be employed if the walls are sufficiently thin and resilient. Adjustment of the gap clearance is also a particularly sensitive adjustment with regards to tuning the resonator (a system for such adjustment will be presently described in connection with Fig. 7).

The tuning of the apparatus shown in Fig. 5 can be most readily accomplished by inserting one or more adjustably retractable plungers or plugs such as the plug 44. Movement of the plug 44 in and out of the cavity resonator through tthe cavity wall alters the volume of cavity, thereby tuning the resonator. A metal housing 46 may be provided about the apparatus of Fig. 5 in order to protect the glass envelope and the resonator structure from shock or mechanical strain. As in Fig. 2, the loop 14, or even the loop 13, might be provided with an adjustment for varying the coupling between its transmission line and the resonator.

The apparatus of Fig. 5 is particularly convenient for replacement purposes. The glass structures 36, 37, 38, the electrode 40, and the top and bottom resonator walls may form a unit which can readily be removed from the rest of the structure by releasing bolts (not shown) which normally hold the housing, the top and bottom resonator walls and the outside resonator wall (which may be radially split in two or more parts) together.

In the manufacture of apparatus such as that shown in Fig. 5 it is convenient to adjust the resonant frequency of the resonator in the following manner. After the inside glass cylinder 36 has been sealed in place and the outside glass envelopes 37, 38 have likewise been sealed onto the resonator walls leaving an opening for application of deforming tools to the resonator surface, and after the upper and lower resonator walls have been assembled together with the circumferential resonator walls (which may be provided in two pieces to facilitate assembly). The resonator may then be tuned by deforming the central portion with a suitable tool, in order to adjust the clearance of the gap 15. With the tuning plug 44 and any other such tuning plugs adjusted at midposition, the shape of the resonator and especially the clearance of the gap 15 is then varied until the resonant frequency of the resonator reaches a desired value. The adjustment is preferably carried out with the assistance of a signal generator of known frequency. The glass envelopes 37 and 38 may then be closed off except for a vacuum connection; the device may then be evacuated and thereafter sealed.

Figure 6:
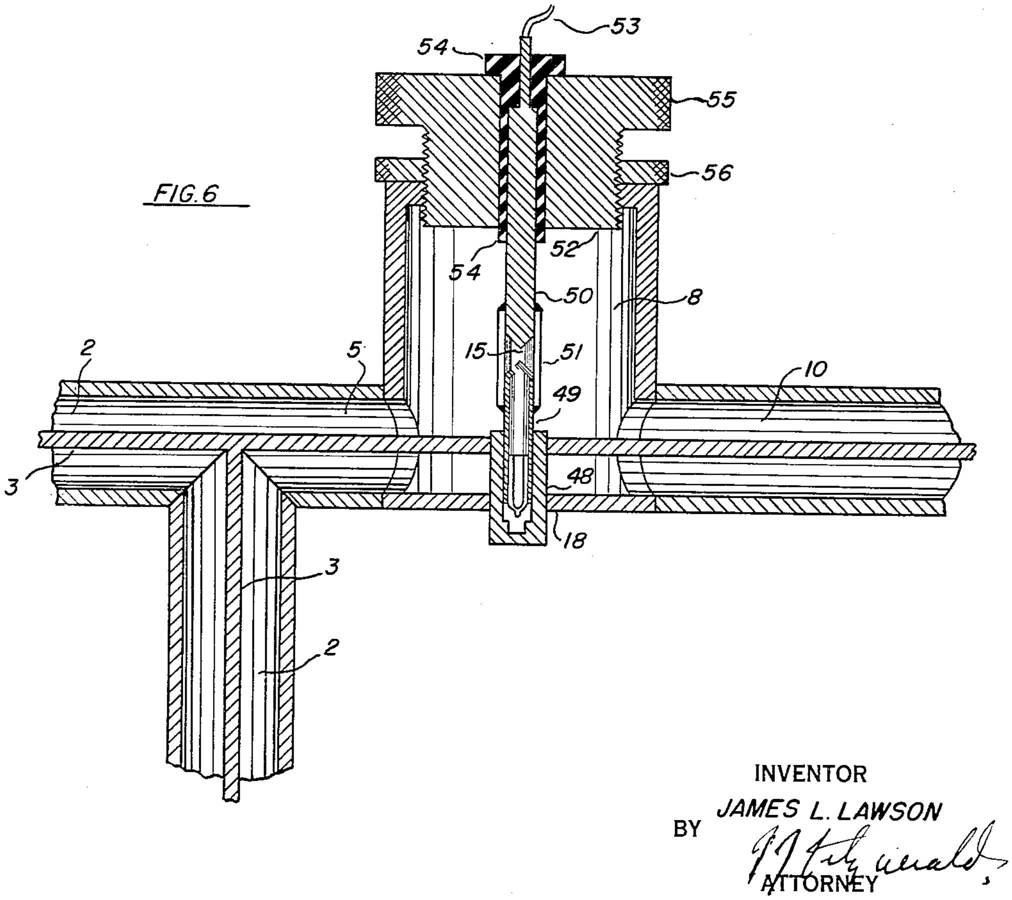
Fig. 6 is a cross section of a modified form of apparatus according to the invention.

Fig. 6 shows another form of apparatus constructed according to this invention. In this figure the junction between the transmission line 2 and the transmission line 5 has a somewhat different configuration from that shown in Figs. 2 and 5, but this causes no essential difference in operation.

In Fig. 6 the transmission lines 5 and 10 are coupled to the resonator 8 not by separate loops such as are shown in Fig. 1 but instead by direct connection to a central cup-shaped conductor 48. This central conductor 48 in effect completes a loop for each transmission line within the resonator 8 and in addition constitutes a clip for holding the electrode 49. On account of the greater "direct coupling" between input and output, this form of device is not recommended for high power operations, although it is satisfactory for use in systems employing low power transmitters.

In the apparatus of Fig. 6 the elements of the resonator which constitute the gap electrode are mounted in a rotating structure which permits a tuning adjustment for regulating the natural frequency of the resonator 8. The gap electrodes 49 and 50 are, as in Fig. 1, connected by a glass sleeve here shown at 51 sealed to the electrodes by waxed joints. The electrode 49 is firmly but slidably engaged in the cup-shaped conductor 48. The latter may be slotted in a plane perpendicular to the transmission lines 2 and 10 in order that spring action can be employed to provide a good sliding electrical contact between the electrode 49 and the cup-shaped member 48. This contact will be maintained when the entire gap structure is moved in the course of the tuning adjustment provided by the threaded plug 52 which may be advanced into or retracted from the cavity, carrying the electrodes and gap structure with it.

The electrode 50 is insulated from the rest of the resonator in order that a steady voltage with respect to the main structure of the resonator 8 may be impressed on the electrode through the lead 53. The resulting potential across the gap 15 is designed to promote the recovery of the resonator 8 after the occurrence of breakdown by attracting to the electrode ions formed by the discharge. Such an arrangement may be desirable for the purpose of receiving signals occurring at extremely short time intervals after the transmitter has ceased operating, such as echoes from nearby objects. The extent and rate of deionization varies considerably with the composition and pressure of the atmosphere in the gap, so that with some gas mixtures satisfactory "clean-up" characteristics can be obtained without the application of any "clean-up" electrosatic potential.

As before pointed out, however, the reduction of residual ionization may reduce somewhat the degree of protection furnished by the apparatus during the initial stage of the breakdown. It is also to be observed that the "clean-up" voltage should not produce voltages across the gap sufficient to create continuous ionization, such as is produced by the electrode 40 in the apparatus of Fig. 5, since such operation would interfere with the "clean-up" function and reduce the strength of received signals.

The electrode 50 is firmly held by the insulation 54 in a screw threaded plunger 52 which is threaded in an aperture in the upper end wall of the resonator 8. The plunger 52 is provided with a flange 55 which may be conveniently provided with a knurled peripheral surface for purposes of manipulation. A lock-nut 56 serves to preserve any desired adjustment of the plunger 52. The plunger 52 will be seen to be capacitively coupled to the electrode 50 across the insulation 54 so that the electrode forms part of the oscillating circuit of the resonator. Turning of the plunger 52 causes it to advance or recede within the cavity, thus tuning the resonator by changing the volume of the cavity.

It will be seen that the structure of Fig. 6 is one in which the portions of the resonator forming the gap 15, together with the glass enclosure, are removable as a unit from the rest of the resonator. Thus the gap assembly may be replaced with ease and with relatively little disturbance of the rest of the apparatus.

Figure 7:
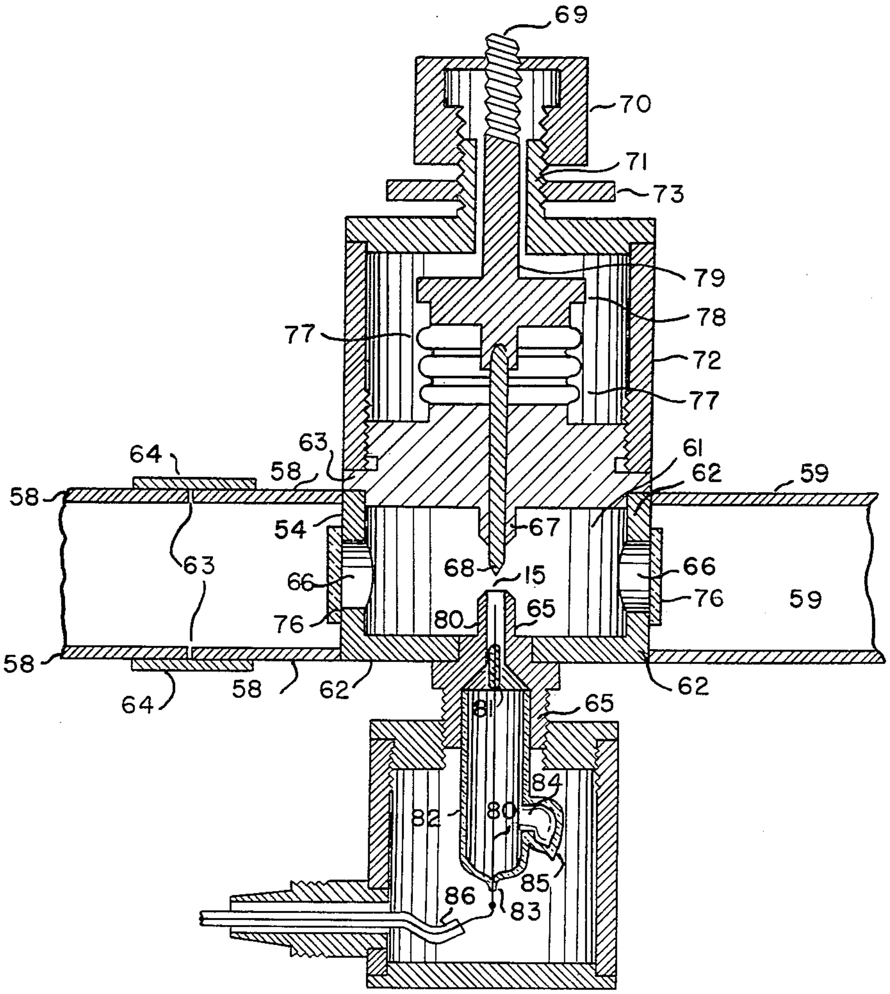
Fig. 7 is a cross section of another modified form of the invention which is adapted for use in systems employing hollow pipe wave guides instead of the coaxial transmission lines shown in the preceding figures.
Figure 8:
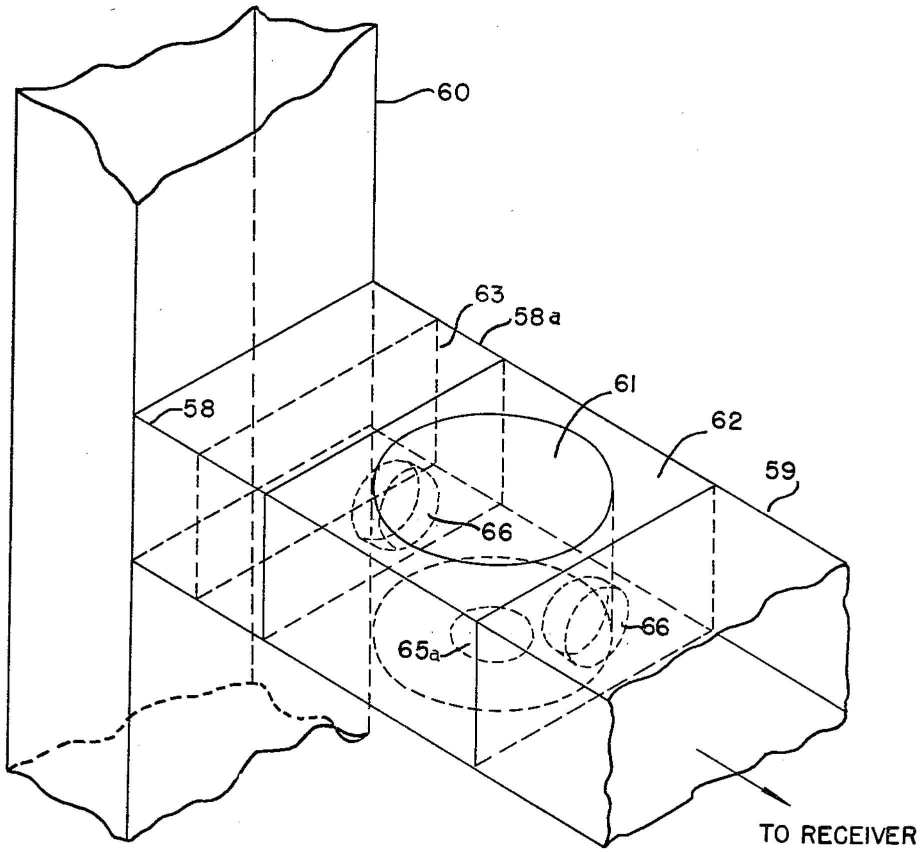
Fig. 8 is an isometric projection of part of the apparatus shown in Fig. 7.

Figs. 7 and 8 show a form of apparatus according to this invention which is especially adapted for use in radio transmitting and receiving systems employing hollow pipe wave guides instead of coaxial transmission lines. It is consequently particularly useful at the shorter wave length and in apparatus employing high transmitter power, where hollow wave guides find particular utility. Hollow wave guides are shown at 58 and 59. These may be round or rectangular, the rectangular form being preferred because it is particularly well adapted for transmitting oscillations in the transverse electrode mode ($H_{0,1}$) while excluding oscillations in other modes. Fig. 8 which is an isometric projection of part of the apparatus shown in Fig. 7, shows more fully the configuration of the wave guides 58 and 59. As shown in Fig. 8, the wave guide 58 communicates with another wave guide 60 which corresponds to the transmission line 2 in Figs. 1, 2 and 5. The junction may be made as shown in Fig. 8 along the broad side of the wave guide 60, this being known as an electric plane junction, or it may be made in one of the narrower walls of the wave guide 60, in which case the axis of the wave guide 60 would be horizontal instead of vertical in Fig. 8, but still perpendicular to the axis of the wave guide 58. The electric plane type of junction shown in Fig. 8 is somewhat to be preferred.

Between the wave guides 58 and 59, the latter of which leads to the receiver input, is interposed a cylindrical cavity resonator 61. Since the dimensions of hollow wave guides are somewhat larger with regard to the wave length than is customary for the dimensions of coaxial transmission lines, the dimensions of the wave guides 58 and 59 are usually such that the cylindrical cavity resonator 61 is somewhat smaller than a section of wave guide slightly longer than the diameter of the cylindrical cavity. In consequence it may be convenient to form the cavity resonator by drilling out a cylindrical cavity in a rectangular block 62 of copper or brass which may be soldered directly to the ends of the wave guides 58 and 59.

In practice, because as hereinafter more fully explained, the wave guide 58 operates as a resonant section during periods of transmitter operation, it is convenient to provide a quarter-wave length of wave guide 58*a* formed integrally with the electric breakdown discharge device or thoroughly connected electrically thereto, as by silver soldering. The joint between the wave guide section 58*a* and the rest of the wave guide 58, which is shown on Figs. 7 and 8 at 63*a* is thereby made to occur at a point in said wave guide where no current, or at most very little current, flows during transmitter operation, whereas if the joint were made at either end of the wave guide 58, large currents would flow across the joint during transmitter operation with consequent losses and other difficulties. For purposes of providing demountability, the joint 63 may be secured by a tight sleeve of conducting material shown on Fig. 7 at 64. The sleeve 64 may also be conveniently provided with clamping means, not shown, for the purpose of maintaining good electrical contact. A similar location of such wave guide joints as may be necessary in the wave guide 59 might also be provided, since during periods of transmission it may also be advantageous to adjust the length of the wave guide 59 so that it operates in a resonant fashion to reduce any overloads that might otherwise be produced in the receiver. The currents occurring in the wave guide 59, however, are ordinarily much less than those occurring during periods of transmitter operation in the wave guide 58 because the electric breakdown discharge apparatus acts to prevent all but a small part of the energy in the wave guide 58 from reaching the wave guide 59, so that in most cases a careful location of wave guide joints in the wave guide 59 is not likely to result in much advantage. During periods of reception, when the transmitter is not in operation, both the wave guide 58 and the wave guide 59 are operated non-resonantly when the system is properly adjusted, so that for purposes of improving reception it is important that wave guide joints be as effective as possible and that losses resulting from poor electrical contact be minimized.

The upper end of the cylindrical cavity in the block 62 is left entirely open for the introduction of a close-fitting cap piece shown at 63 on Fig. 7. The lower end is closed except for a small hole 65*a* (see Fig. 8) which is provided for the introduction of the lower gap electrode 65 (see Fig. 7). Coupling between the wave guides and the cylindrical cavity resonator 61 is provided by holes drilled along the axis of the wave guide penetrating through the walls of the cylindrical cavity as shown at 66.

The apertured termination of the wave guide furnished by the block 62 and one of the holes 66 furnishes a slightly inductive load to the wave guide. The amount of inductive susceptance thus put across the line may be varied by changing the configuration of the aperture 66. Elongating the apertures in the magnetic plane, that is in the direction of the longer cross-sectional dimension of the wave guide, or narrowing these holes in the electric plane, which is at right angles to the magnetic plane and also includes the axis of the wave guide, will result in reducing the inductive susceptance and, if carried far enough, will introduce a capacitive susceptance. Elongation of the cross section of the holes in the electric plane or narrowing in the magnetic plane will, on the other hand, increase the inductive susceptance. The amount of inductive susceptance should be kept small in order that a large voltage step-up may occur in the resonator 61.

The metallic cover 63 of the cylindrical cavity resonator 61 carries the upper electrode of the discharge gap 15, which electrode is made of two parts, a hollow socket sleeve 67 which is slotted longitudinally (i. e. vertically with respect to Fig. 7) so that it may exert a gripping action inwardly by spring pressure and an inner member 68 which may be slipped up and down within an axial hole in the top member 63, being gripped by the surrounding element 67 to provide good electrical contact and also mechanical friction. The electrode member 68 is fastened to a rod 69 which is threaded at its upper end and is adapted to propel the electrode member 68 back and forth in connection with screw thread mechanisms at its upper end which include a threaded knurled knob 70, a threaded sleeve 71 mounted on a housing 72, and a lock-nut 73. The longitudinal adjustment of the electrode 68 accomplished in this manner by turning the knob 70 is effective to vary the resonant frequency of the resonator 61 by variation of the gap 15 and the capacitance thereof.

In order to maintain a partial vacuum in the gap 15, as in the apparatus of Figs. 2, 5 and 6, glass windows 76 are provided across the apertures 58. The windows are sealed circumferentially to the metal wall of the block 62, preferably by a high temperature glass-to-metal seal, although they may also be sealed in place by wax seals such as those previously described in connection with Fig. 2. Each glass window 76 may be sealed to the outer wall of the block 62 as shown in Fig. 7 or it may be sealed to the inner wall of the aperture 66. In order to prevent the partial vacuum in the resonator 61 from being destroyed through leakage between the electrode element 68 and the cover element 63, a Sylphon bellows 77 is provided between the cover element and a flange 78 on the rod 69, being soldered in the usual manner to provide a vacuum-tight joint.

The lower electrode 65 of the gap 15 is made hollow for the double purpose of facilitating the evacuation of the resonator and permitting the introduction of an electrode 80 which serves the same purpose as the electrode 40 of Fig. 5. The electrode is centered in the hollow part of the structure 65 by means of an elongated bead 81 fastened firmly upon the electrode 80 but fitting loosely within the structure 65. A glass tube 82 circumferentially sealed into the lower portion of the structure 65 serves for additional support of the electrode 80 at the point 83 and also serves for the evacuation of the cavity through a branch tube 84 which is sealed off at 85 after evacuation has been completed to the desired degree. An insulated flexible lead 86 connects a suitable source of electrical potential with the electrode 80. A housing 87, which is preferably of metal, is provided to protect the glass tube 82 against breakage and incidentally to act as a shield surrounding the electrode 80 and the lead 86.

Resonators having shapes other than that of the cylindrical resonator 61 could of course be used in an apparatus of the general nature of that shown in Figs. 5 and 6. A toroidal resonator similar to that shown in Fig. 3 could also be used. Also, if the resonator walls are made of relatively thin metal instead of being cut out of a block of metal such as the block 54, or if a part of the resonator walls were made of rather th·n resilient metal, the tuning could be accomplished by deformation of the cavity, and particularly by that type of deformation which is adapted to vary the clearance of the discharge gap 15 and consequently to vary the capacitance across the cavity at its point of highest voltage stress.

As in the case of the apparatus of Figs. 2, 5 and 6, the length of the transmission means leading to the resonator should be carefully adjusted for best results. In order to prevent the acceptance of excess energy by the wave guide 58 after breakdown has occurred in the resonator 61, it is desired to present a low impedance at the mouth of the wave guide 58 in order to prevent acceptance of excess energy in the wave guide 58 and to promote the transmission along the wave guide 60 past the junction with the wave guide 58. Consequently the length of the wave guide 58 in Figs. 7 and 8 should closely approximate an integral number of half-wave lengths of the oscillations in the wave guide and not an odd number of quarter-wave lengths which was found desirable in the case of the coaxial line 5 in Figs. 2, 5 and 6. As in the case of the coaxial line 5, however, allowance is preferably made for the "end effect" of the wave guide junction and for the loading provided at the resonator end of the line by the coupling arrangement, which in the case of Figs. 7 and 8 comprises the wall closing off the end of the wave guide together with the aperture 66 therein. In practice this last consideration requires only a small modification of the length of wave guide 58.

It is to be noted that the windows 76 are provided at relatively low voltage areas of the resonator structure, which tends to reduce the losses occurring in the glass and to increase the Q of the resonator. With high power operation, however, the "leakage field" of the coupling aperture 66 becomes sufficiently intense to set up a glow discharge in the neighborhood of the glass and thus introduce undesirable energy losses. Consequently, for high power operation the glass vacuum-maintaining means is preferably located at a position intermediate of the discharge gap and the coupling devices, as in Fig. 5.

If breakdown should be desired only at high line voltage levels (i. e., when high voltages occur in the line 5), the resonator providing voltage step-up could be dispensed with and a spark gap placed directly across the line 5 in place of the loop 13. Like the loop 13, such a gap should be spaced, in a coaxial line system, at an odd number of quarter-wave lengths from the junction of the lines 2 and 5 in order that the low impedance caused by the breakdown might "appear," on account of energy reflections, as a high impedance at the junction and thus control acceptance of energy by the discharge gap. A system not incorporating a voltage step-up between the input coaxial or pipe wave guide and the discharge gap, however, would be of small utility in the present state of the art, since it would permit voltages to reach the receiver sufficient to damage permanently any of the crystal detector receivers in use now. Even if receivers having a higher overload limit should become usable, protective discharge devices without voltage-step-up resonators are not likely to be practical for protecting such receivers during transmitter operation, because the power absorbed by the gap is approximately the geometric mean between the transmitter power output and the power of the signal passed to the receiver. If the latter value is appreciably raised, the power dissipated at the gap will increase and with it also the sputtering of metal particles, the formation of partially conducting films on the glass walls, and so on, reducing the service life of the breakdown device.

The provision of electrical breakdown apparatus provided with resonant step-up of the breakdown-initiating voltage has made it practical to operate transmission and reception systems employing a common antenna in services in which such systems would otherwise be quite impractical, and in particular has greatly reduced the apparatus, weight and space necessary for the operation of radio-echo detection and locating systems by the introduction of a new component which is relatively light and occupies but a small space.

In the appended claims the term "wave guide," in accordance with its proper sense, is used to include in its meaning transmission lines such as coaxial conductor lines as well as other transmission means, such as hollow conducting pipes. Careless colloquial usage, which uses the term for hollow pipe transmission means and avoids its use for other types of arrangements for guiding electrical waves, is to be disregarded in the interpretation of this patent, for it is to be remembered that a guided wave exists in the space surrounding a suitably excited two-conductor transmission line (parallel or coaxial) just as surely as such a wave may exist inside of a hollow conducting pipe, the differences being only in the form of the guided wave.

What I desire to claim and secure by Letters Patent is:

1. A low power TR box comprising, in combination, a hollow cylindrical cavity resonator having end closure walls, a conductive tuning plug threaded into one of said walls and capable of being extended by variable amounts into said cavity resonator along its longitudinal axis, a first electrode supported by said tuning plug and having one extremity projecting into said cavity resonator, said first electrode being electrically insulated from said conductive tuning plug, a sleeve, a second electrode, said sleeve being secured to said first and second electrodes so as to retain these electrodes in alignment a fixed distance apart, and means for maintaining a partial vacuum within said sleeve to promote an electrical discharge between said electrodes whenever said cavity resonator is excited at a predetermined level by the coupling thereto of electromagnetic energy.

2. A low power TR box for use with coaxial line transmission systems comprising, in combination, a hollow, cylindrical cavity resonator having end closure walls, a conductive tuning plug detachably mounted in one of said walls and capable of being threaded into said cavity resonator along the longitudinal axis thereof, a first electrode coaxially disposed within said tuning plug and having one of its extremities projecting into the cavity resonator space, said first electrode being electrically insulated from said conductive tuning plug, a sleeve, a sleeve, a second electrode, said sleeve being secured to that extremity of said first electrode which projects into said cavity resonator space and to one end of said second electrode for positioning these electrodes in alignment a fixed distance apart, means for maintaining a partial vacuum within said sleeve to accelerate an electrical discharge between said electrodes whenever said cavity resonator is excited at a predetermined level and means for establishing a potential difference between said first electrode and said cavity resonator thereby to promote a recovery of said cavity resonator after the occurrence of such an electrical discharge.

3. A low power TR box for use with coaxial line transmission systems comprising, in combination, a hollow, cylindrical cavity resonator having end closure walls, a detachable tuning plug threaded in one of said walls and capable of being inserted by variable amounts into said cavity resonator along its longitudinal axis, a first electrode coaxially mounted within said tuning plug and having a portion projecting into said cavity resonator space, said first electrode being electrically insulated from said tuning plug, a sleeve, a second electrode, said sleeve maintaining one end of said second electrode in spaced alignment with the extremity of the projecting portion of said first electrode, means for maintaining a partial vacuum within said sleeve, a cup-shaped conductive member secured to the other end wall for slidably receiving the other end of said second electrode whereby a low impedance path is effectively formed from end wall to end wall along the longitudinal axis of said cavity resonator whenever an electrical discharge occurs between said electrodes in response to a predetermined level of excitation of said cavity resonator.

4. A low power TR box for use with coaxial line transmission systems comprising, in combination, a hollow, cylindrical cavity resonator having end closure walls, a detachable conductive tuning plug threaded in one of said walls and capable of being inserted by variable amounts into said cavity resonator along its longitudinal axis, a first electrode coaxially disposed within said tuning plug and electrically insulated therefrom, one end of said first electrode extending into said cavity resonator space, a hollow sleeve made of a material that is transparent to the propagation of electromagnetic energy, a second electrode, said sleeve being secured to that end of said first electrode which extends into said cavity resonator space and one end of said second electrode for retaining these electrodes in alignment a fixed distance apart, means for establishing a partial vacuum within said sleeve, a cup-shaped member secured to the other end wall for slidably receiving the other end of said second electrode, input and output coaxial transmission lines coupled to said cavity resonator, the inner conductors of said input and output coaxial transmission lines extending through the side wall of said cavity resonator and terminating at diametrically opposite side wall portions of said cup-shaped member whereby parallel side wall lengths of said cup-shaped member serve as the loop sections of said input and output coaxial transmission lines.

References Cited in the file of this patent

UNITED STATES PATENTS

| | | |
|---|---|---|
| 1,035,958 | Girardeau | Aug. 20, 1912 |
| 2,106,770 | Southworth | Feb. 1, 1938 |
| 2,611,079 | Varela | Sept. 16, 1952 |
| 2,688,746 | Young | Sept. 7, 1954 |